United States Patent [19]
Perry

[11] Patent Number: 4,961,575
[45] Date of Patent: Oct. 9, 1990

[54] HIDE AND SEEK GAME

[76] Inventor: Stephen J. Perry, 38 Earl Street, Unit #10, Toronto, Ontario, Canada, M4Y 1M3

[21] Appl. No.: 343,669

[22] Filed: Apr. 27, 1989

[51] Int. Cl.[5] .............................................. A63H 5/00
[52] U.S. Cl. ................................ 273/1 E; 340/825.36; 340/825.49
[58] Field of Search ............... 273/1 R, 1 E, 213, 416, 273/58 G; 446/456; 340/323 R, 346, 825.36, 825.49; 342/42, 125

[56] References Cited

U.S. PATENT DOCUMENTS

| 3,782,730 | 1/1974 | Horchler | 273/213 |
|---|---|---|---|
| 4,173,016 | 10/1979 | Dickson | 342/42 |
| 4,421,319 | 12/1983 | Murphy | 273/213 |
| 4,476,469 | 10/1984 | Lander | 340/825.49 |
| 4,496,149 | 1/1985 | Schwartzberg | 273/1 E |
| 4,660,039 | 4/1987 | Barricks et al. | 273/213 |
| 4,749,198 | 6/1988 | Brailean | 273/213 |
| 4,785,291 | 11/1988 | Hawthorne | 342/125 |

FOREIGN PATENT DOCUMENTS

| 3609016 | 9/1987 | Fed. Rep. of Germany | 273/213 |
|---|---|---|---|
| 8902768 | 4/1989 | PCT Int'l Appl. | 273/213 |

OTHER PUBLICATIONS

"Transistorized Golf Ball", Radio Electronics, Jun. 1956, p. 79.
"Finding That Bleeping Ball", Sports Illustrated, Mar. 29, 1971, vol. 34, No. 13, p. 12.
Hide 'N Sneak Promotional Brochure by Worlds of Wonder-Date Unknown.

Primary Examiner—Edward M. Coven
Assistant Examiner—Jessica J. Harrison
Attorney, Agent, or Firm—Sim & McBurney

[57] ABSTRACT

Apparatus for playing hide and seek comprising a plurality of portable units adapted for being carried by a corresponding number of individuals in hiding, for generating respective output signals each contributing to an output signal field in the vicinity of the individuals in hiding, and a further portable unit adapted for being carried by a further individual seeking to locate the individuals in hiding, the further portable unit including circuitry for measuring field strength of the output signal field and in response generating a further signal representative of relative proximity to respective ones of the individuals in hiding, whereby generation of the further signal assists the further individual in locating the individuals in hiding. The portable hider units also include a selective cloaking feature.

16 Claims, 5 Drawing Sheets

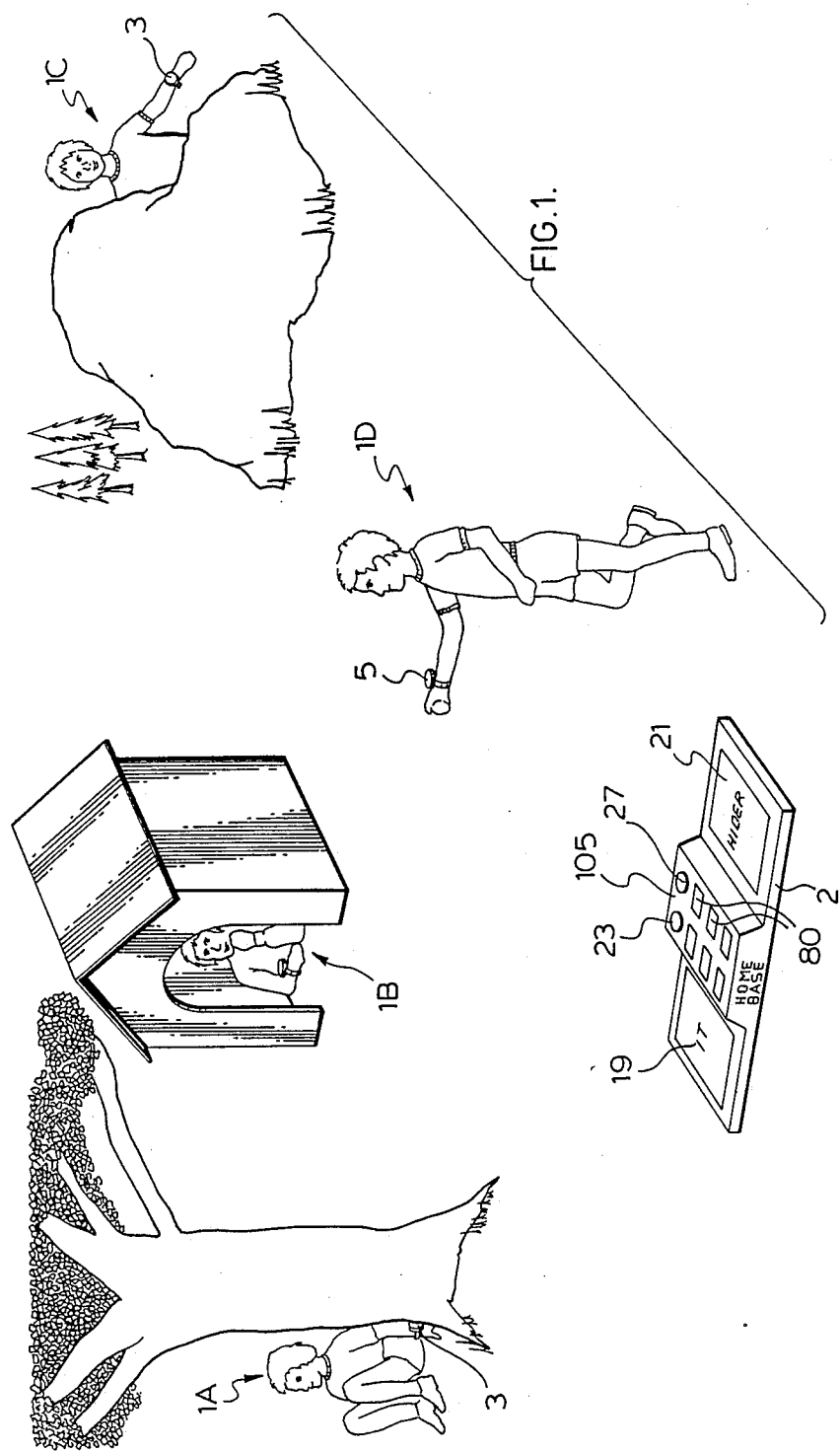

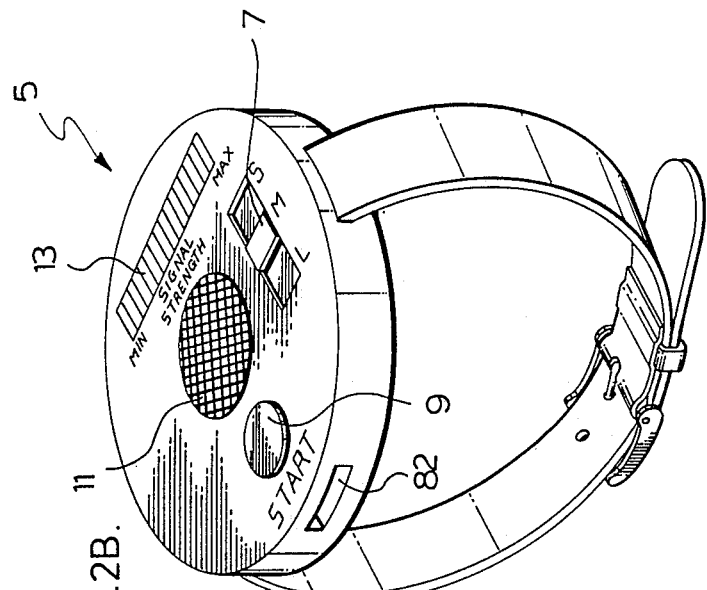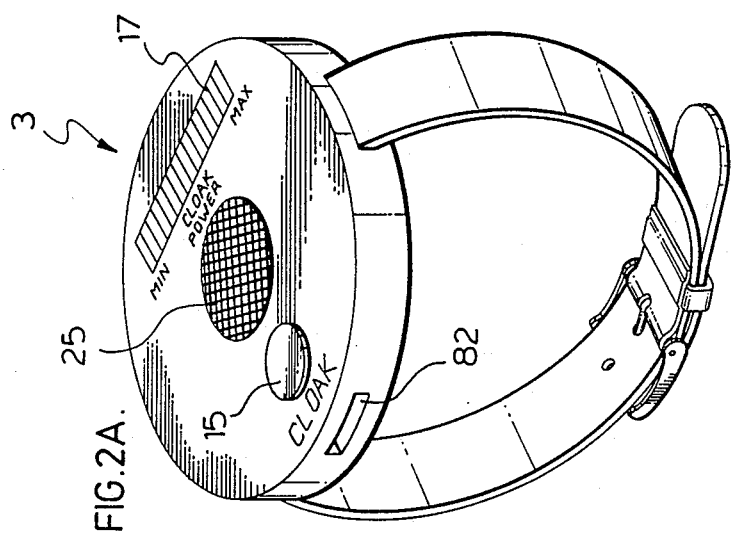

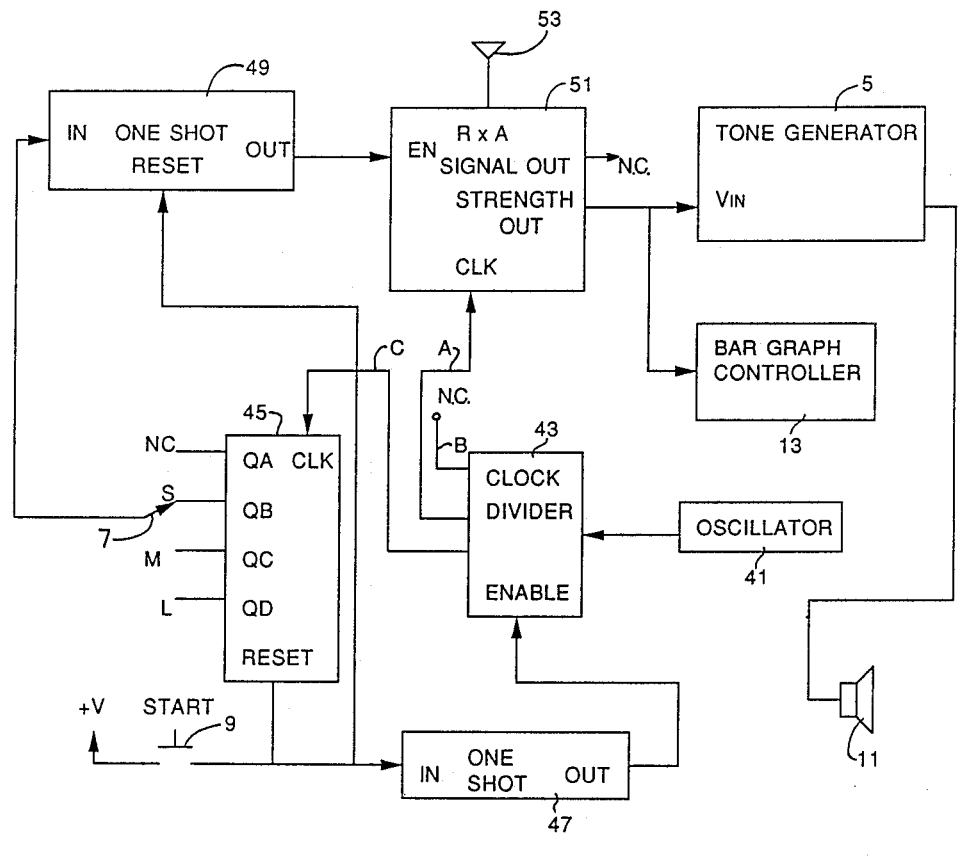
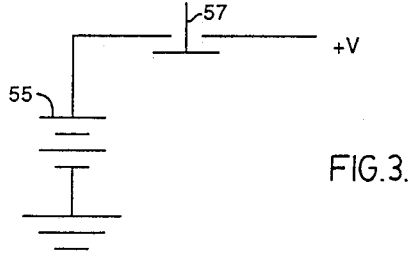
FIG.3.

HIDE AND SEEK GAME

FIELD OF THE INVENTION

The present invention relates to childrens' games, and more particularly to an enhanced game of hide and seek.

BACKGROUND OF THE INVENTION

In its most general form, the well known childrens' game of hide and seek is played by a plurality of children, one of whom is designated as the seeker (commonly referred to as "IT"), and the remaining children being designated as hiders. The seeker remains at a predesignated location (generally referred to as "home base"), covers his or her eyes and begins counting to a predetermined number while the hiders depart from home base and attempt to find suitable hiding places in which to hide from the seeker. Upon counting to the aforementioned predetermined number, the seeker announces that he or she is commencing to search or seek out the hiders in their various hiding places (i.e. by yelling an appropriate warning such as "ready or not, here I come!"). While the seeker is searching for the hiders, individual ones of the hiders endeavour to return to home base.

Upon discovering one of the individuals in hiding, both the seeker and the hider race towards home base. In the event that the seeker reaches home base before the hider, the hider becomes the new seeker and calls in the remaining hiders to return to home base (i.e. by yelling "all ye all ye in come free!"). Thereafter, the game begins again with the new deignated seeker counting to the predetermined number, etc.

In the event that the hider reaches home base before the seeker, the hider is considered "safe", and the seeker continues searching for the remaining hiders. In the event that all of the hiders return to home base without being caught by the seeker, the game re-starts with the same designated seeker.

DESCRIPTION OF THE PRIOR ART

Many prior art radio signalling systems have been developed for use in novelty devices such as games, range finders, etc.

U.S. Pat. No. 4,173,016 (Dixon) discloses an interpersonal introduction signalling system wherein at least two persons may communicate via radio transceivers using a code system for defining a plurality of categories, each of which has a particularly identifiable characteristic. Each person carrying a transceiver can select a particular code to send and a particular code to accept, such that designated information is transmitted and/or received. Thus, the transceivers of Dixon may be used to implement a system of introducing people to each other by matching remote calls and responses based upon the preselected code sequence.

U.S. Pat. No. 4,297,701 (Henriques) teaches a portable range finder for use by golfers, in combination with a plurality of flagstick units located at a golf course as well as a master club house unit. Each hand-held unit includes a power source, a transceiver, a distance determining circuit, a keyboard with display, an audio generator and a microprocessor which controls the mode of the hand-held unit. To determine the distance between a hand-held unit and a flagstick unit, a button on the keyboard is depressed to select a particular flagstick unit. The distance determining circuit is in the form of a timing circuit which measures the amount of time required for the signal from the transceiver to reach the selected flagstick unit and be re-transmitted by the flagstick unit back to the particular hand-held unit. Accordingly, a golfer using the range finder of Henriques is provided with an indication of distance. The flagstick units may also be programmed to send an identification code bit after the transmitted signal so that the master club house unit receiving this identification signal may analyze the signal for determining the location of particular golfers or other information.

U.S. Pat. No. 4,023,167 (Wahlstrom) teaches a system in which bursts of radio frequency are transmitted to excite and thereby detect the presence of passive resonant circuits. If a circuit is resonant at a particular burst frequency, it is excited, rings and emits a radio frequency signal. Following each transmitted burst, a receiver is turned on to receive energy emitted by the resonant circuit so that if a resonant circuit is excited, its emitted energy is received and the particular resonant circuit can be identified.

U.S. Pat. No. 3,790,948 (Ratkobich) discloses a radio transmitting hunting arrow to aid in locating wounded game. The antenna for the transmitter is carried by the hollow shank of the arrow. A radio receiver, carried by the hunter, is tuned to the signal frequency of the transmitter and has a directional antenna and means for finding the direction of the transmitter.

U.S. Pat. No. 3,336,530 (Sloan et al) teaches a direction finding system for hunting dogs, comprising a miniaturized transmitter suitably affixed to and carried by a dog collar. An omnidirectional antenna is also suitably mounted to the dog collar so as to extend vertically upward. The antenna is connected to the output of a transmitter which radiates electromagnetic waves substantially uniformly in all directions. A miniaturized receiver is carried by the hunter, and provides a highly directional antenna, such as a loop antenna. The receiver generates suitable audible tones in response to reception of radio transmissions from the transmitter. By selectively orienting the antenna while listening to the audible tones, the hunter is readily able to determine the general direction from which the radio transmissions are being received.

U.S. Pat. No. 4,736,196 (McMahon et al) discloses an electronic monitoring system for monitoring the location of an individual, and includes a band which is adapted to be strapped to the individual's wrist or ankle. A trigger, transmitter and antenna are incorporated into the band. The trigger controls operation of the transmitter and activation is effected by a portable authority retained control unit. The trigger deactivates the transmitted under predetermined conditions (such as removal of the band) and reactivation requires utilization of the control unit. As with the aforementioned patents of Sloan et al and Ratkobich, the McMahon et al system utilizes a directional loop antenna for permitting close tracking of the individual. Preferably, the receiver is operable at certain predetermined frequencies corresponding to the frequencies of certain detection signals. Thus, one receiver may be used to monitor a group of restricted individuals.

U.S. Pat. No. 3,931,622 (Friedman) discloses a voice modulated transponder system comprising an interrogator and a light-weight transponder. The interrogator is preferably airborne and the transponder is preferably located on the ground. The interrogator can locate the position of the transponder and simultaneously therewith two-wave voice communications may be established between the interrogator and the transponder.

U.S. Pat. No. 4,476,469 (Lander) teaches a locator apparatus for assisting and locating an object. The system comprises a hand-held "searcher" comprising a short range signal transmitter powered by an internal cell or battery and having electronic circuitry for generating an addressed signal when activated by a switching circuit. A miniature "locator" comprises a transponder powered by an internal cell or battery and having electronic circuitry for selectively addressing, with coded signals, several locators which may be placed with or on respective objects or attached thereto.

All of the above-discussed prior art systems teach radio signalling apparatus between two or more portable units. However, each of the prior art systems requires the use of one of either a highly directional antenna for locating the direction of a transmitter, or encoded signalling for conveying information. Both prior art alternatives require expensive circuitry to implement, and none of the systems relate even remotely to the field of childrens' games.

SUMMARY OF THE INVENTION

According to the present invention, radio controlled apparatus is provided for assisting both the hiders and seeker in a game of hide and seek. Each of the hiders is provided with a portable transmitter for generating continuous RF (radio frequency) output signals. The seeker is furnished with a portable receiver unit for receiving and measuring the field strength of the cumulative RF signal field generated by the plurality of transmitters. Thus, the seeker is provided with an overall indication of relative proximity to respective ones of the hiders (although not necessarily to specific ones of the hiders).

The transmitters held by the hiders are preferably provided with disabling circuitry for temporarily disabling the individual transmitters, thereby removing the particular hiders from the cumulative field. This assists the hiders in avoiding detection by the seeker.

In general, according to the present invention, there is provided an apparatus for playing an enhanced game of hide and seek, comprising:

a plurality of portable transmitter means adapted for being carried by a corresponding number of individuals in hiding, for generating respective output signals each contributing to an output signal field in the vicinity of said transmitters, and portable receiver means adapted for being carried by a further individual seeking to locate said individuals in hiding, for measuring field strength of said output signal field and in response generating a further signal representative of relative proximity to respective ones of said transmitter means, whereby generation of said further signal assists said further individual in locating said individuals in hiding.

According to a further aspect of the present invention, there is provided an apparatus for playing an enhanced game of hide and seek, comprising:

a plurality of portable hider units for generating respective output signals of predetermined strength; and a single portable seeker unit for receiving said respective output signals and in response detecting said predetermined strength and generating a further signal representative of relative proximity to respective ones of said hider units.

DESCRIPTION OF THE DRAWINGS

A preferred embodiment of the present invention will be described in detail below with reference to the following drawings, in which:

FIG. 1 illustrates a plurality of children playing an enhanced game of hide and go seek in accordance with the present invention;

FIG. 2A and 2B are perspective views of a hider unit and a seeker unit, respectively, in accordance with the preferred embodiment;

FIG. 3 is a block schematic diagram of a hider unit in accordance with the preferred embodiment;

DETAILED DESCRIPTION OF THE PREFERRED EMBODIMENT

Figure 4:
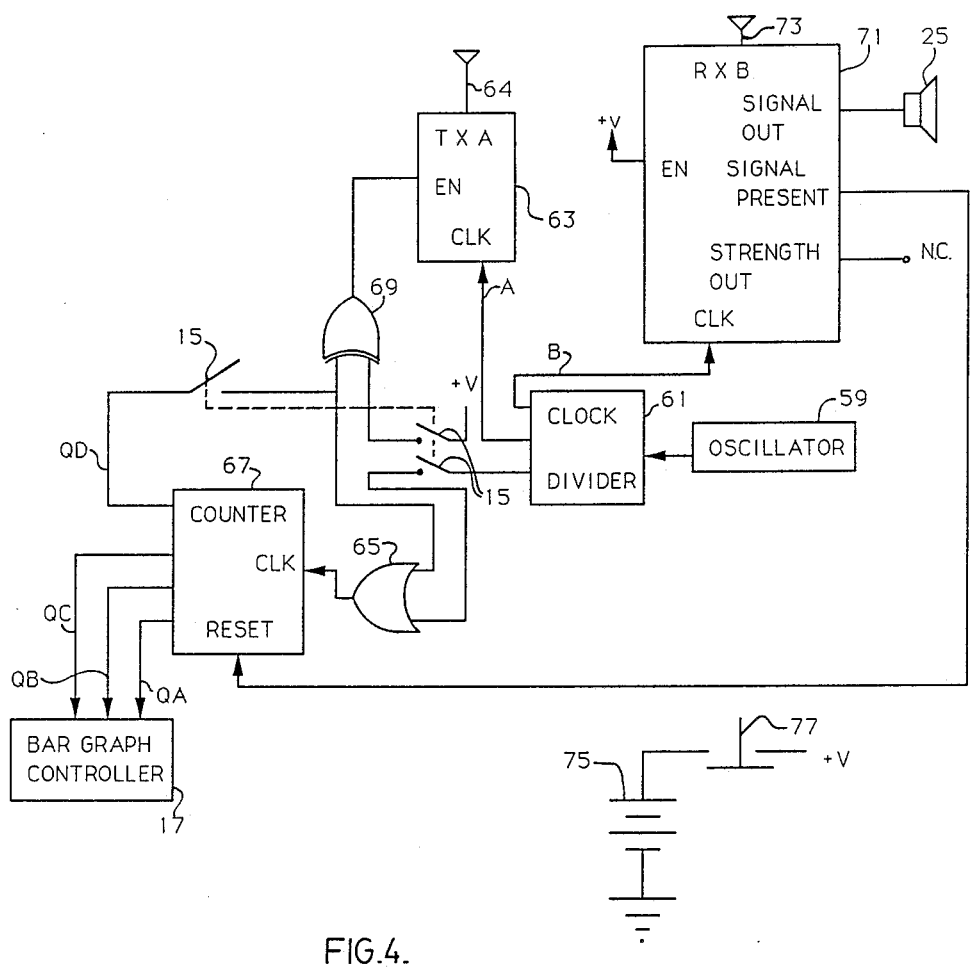
FIG. 4 is a block schematic diagram of a seeker unit in accordance with the preferred embodiment.

With reference to FIG. 1, a first group of players 1A, 1B ... 1C are shown in hiding from a further play 1D. For the purpose of describing the present invention, the players 1A, 1B ... 1C will be referred to herein as "hiders" while the player 1D will be referred to herein as the "seeker". In accordance with the general principles of hide and seek, the hiders 1A, 1B ... 1C and the seeker 1D first congregate at a home base 2. Next, the hiders 1A, 1B ... 1C depart from home base 2 in different directions in order to hide from the seeker 1D while the seeker 1D remains at home base 2 and covers his or her eyes. After a predetermined length of time the seeker 1D begins searching for the various hiders 1A, 1B ... 1C while the hiders attempt to reach home base 2 without being caught by the seeker.

Specifically, in the event that one of the hiders 1A, 1B ... 1C is located by the seeker 1D, the hider and seeker race to home base 2 with the result that in the event the hider reaches home base prior to the seeker, the hider is considered to be "safe", whereas in the event the seeker 1D reaches home base 2 before the hider, the located hider becomes the new seeker in a new round of the game.

In accordance with the present invention, each of the hiders 1A, 1B ... 1C are provided with a portable hider unit 3. According to the preferred embodiment, the hider unit 3 is strapped to the hider's wrist for easy transportation. The seeker 1D is provided with a seeker unit 5 which can be either a hand-held unit as shown in FIG. 1, or else can be strapped to the seeker's wrist as shown in FIG. 2B.

Each of the hider units 3 comprises circuitry for generating a first signal (preferably an FM radio frequency signal), and the seeker unit 5 comprises circuitry for detecting the presence and signal strength of the respective signals generated by the hider units 3.

More particularly, with reference to FIGS. 1, 2A and 2B, when the hiders 1A, 1B ... 1C and the seeker 1D congregate at the home base unit 2 to begin a round of the game, the seeker first selects a predetermined position of three-position switch 7 on his or her seeker unit 5. As discussed in greater detail below with reference to FIG. 4, the three-position switch 7 is selectable between S, M, and L positions designating short, medium and long hiding time sequences, respectively. The S, M or L time sequences correspond to the time allocated to the hiders 1A, 1B ... 1C to hide from the seeker 1D while the seeker covers his or her eyes. This time delay is preferably agreed upon by all players in advance of starting the game. A short (i.e. S) time delay would be appropriate for younger children, while the M and L time delays would be appropriate for older children and for playing of the game outdoors.

The game is commenced responsive to the seeker 1D depressing a start button 9 on the seeker unit 5. The seeker then covers his or her eyes while the hiders hide. After expiration of the predetermined length of time established by the position of time delay switch 7, the seeker unit 5 begins generating an audible tone via speaker 11 as well as preferably generating a visual display via LED bar graph 13 indicative of the cumulative signal strength of the signals output from the various hider units 3.

For example, the audible tone may be in the form of a pulsed "beeping" sound in which the pulsing rate and frequency of the sound is proportional to the detected signal strength.

By listening to the audible tone from speaker 11 and observing the signal strength value appearing on LED bar graph 13, the seeker 1D is assisted in his or her search for the hiders 3 by virtue of being provided with an indication of the relative proximity to respective ones of the hiders 3. In accordance with well known radio theory, the detected signal strength, and consequently the generated tone frequency and signal strength displayed by LED bar graph 13 will vary as the average of the inverse square distance from respective ones of the hider units 3.

As described above, each of the hider units 3 constantly transmits a signal for reception by seeker unit 5. However, in order to offset the tactical advantage of the seeker 5 knowing his or her relative proximity to various ones of the hiders 1A, 1B . . . 1C, each of the hider units 3 is provided with a cloak button 15 for inhibiting generation of the local internal radio signal. Thus, in the event that the seeker 1D is approaching hider 1A, the particular hider 1A will hear the seeker 1D approaching as a result of the sound generated through speaker 11. The hider 1A may then depress the cloak button 15 of his or her hider unit 3 thereby disabling the internal radio signal transmitter such that the seeker 1D is momentarily unable to determine the relative proximity of the particular hider 1A with respect to the overall radio signal field strength of hiders 1B and 1C. In other words, the particular hider unit 3 of hider 1A is effectively removed from the cummulative radio frequency field detected by the seeker 1D.

In order to make the game fair, circuitry is also provided within the hider units 3 for limiting the total length of time per game that the cloaking function may be invoked.

More particularly, as described in greater detail below with reference to FIG. 3, each hider unit 3 incorporates circuitry for measuring the total length of time that the cloak button 15 has been depressed and in response disabling the cloaking function after a predetermined total length of time during which the cloaking function has been active, as indicated by LED bar graph 17 on each of the hider units 3. For example, the hider units 3 may be configured to allow use of the cloaking function over a cumulative total of one minute per game (whether the cloak button 15 is depressed continuously over one minute, or intermittently accumulating to one minute).

The LED bar graph 17 provides the hider 1A, 1B . . . 1C with a visual indication of exactly the time remaining during which he or she may continue to utilize the cloaking function. Once the hider 1A, 1B . . . 1C has used the cloak function for the predetermined accumulated length of time, subsequent depression of the cloak button 15 will not inhibit transmission of the radio frequency signal.

As discussed above, one object of the game is for the hiders 1A, 1B . . . 1C to reach the home base unit 2 without being caught by the seeker 1D.

The home base unit 2 is therefore equipped with a first base pad 19 associated with the seeker 1D and a second base pad 21 associated with the hiders 1A, 1B . . . 1C.

In the event that the seeker reaches home base 2 and depresses the foot pad 19 before a located hider (e.g. 1B) is able to depress foot pad 21, a light 23 is illuminated indicating that the seeker 1D reached home base before the hider. The located hider then becomes the new seeker for a new round of the game.

At the same time, home base unit 2 generates a further radio frequency signal at a different frequency than that transmitted by the hider units 3. The radio frequency signal transmitted by home base unit 2 is received by the respective hider units 3 which, in response generate a distinctive melody via speaker 25 for alerting the remaining hiders 1A, 1C that the located hider has been caught, and that the game is to re-start with a new seeker.

Alternatively, in the event the located hider 1B reaches the home base unit 2 before the seeker 1D, a second light 27 is illuminated indicating that the located hider won the race and is safe. The seeker 1D then continues searching for the remaining hiders.

The hiders 1A, 1B . . . 1C may return at any time to home base unit 2 in order to become safe. In other words, the hiders do not have to wait to be located by the seeker 1D prior to returning to home base.

In the event that all of the hiders return to home base unit 2 without being caught or located by the seeker 1D, the game is re-started by depressing foot switch 19, the same players playing their respective roles as hiders and seekers.

Turning to FIG. 3, a block schematic diagram is shown illustrating the seeker unit 5 in accordance with the preferred embodiment. An oscillator 41 generates a high frequency signal for application to a clock divider 43. Oscillator 41 may be in the form of a crystal oscillator. Clock divider 43 generates respective divided clock signals A, B and C based on the high frequency signal generated by oscillator 41. In particular, the A and B clock signals are in the form of high frequency signals which may be used directly or filtered into appropriate sine wave carrier frequency signals.

The divided down clock signal C is applied to a clock input CLK of a counter 45.

In operation, the start button 9 is depressed, thereby resetting counter 45 and triggering one-shot circuits 47 and 49. Button 9 is preferably spring loaded such that when released the contact is broken, thereby allowing counter 45 to count in response to receiving clock signals C from clock divider 43. As counter 45 commences counting, respective outputs QA, QB, QC and QD go successively from logic low to logic high voltage levels. According to FIG. 3, the switch 7 is shown in the S or "short" delay position with the result that one shot 49 generates an output enable signal in response to the QB output of counter 45 going from a logic low to a logic high voltage level.

A first radio frequency receiver 51 is enabled responsive to receiving the output enable signal from one shot circuit 49. The receiver 51 receives clock signal A from clock divider 43 in order to demodulate the FM signals received via antenna 53. The antenna 53 is not shown in FIG. 2B, but is preferably in the form of a loop antenna wire extending around the periphery of the seeker unit housing.

Thus, in response to being enabled after expiration of the predesignated time delay S, M or L during which the hiders 1A, 1B ... 1C may hide, receiver 51 receives the radio frequency signals generated by the hider units 3 and in response generates a voltage from a field strength output thereof in the form of a DC averaged signal proportional to the cumulative field strength in the vicinity of the receiver.

The DC averaged signal is applied to a voltage control input Vin of a tone generator 55. As discussed above, tone generator 55 preferably generates a continuous tone or pulsated beeping tone having a frequency and/or pulse rate proportional to the signal strength detected by receiver 51. The tone generator 55 is connected to loudspeaker 11 for generating the audible tone.

Also, as discussed above, the detected field strength is preferably displayed via bar graph controller 13.

Hence, as the seeker 1D moves through various locations within the radio field generated by the respective hider units 3, the cumulative field strength is detected via seeker unit 5, thereby providing the seeker 1D with an indication of relative proximity to the various hiders.

The seeker unit 5 is preferably powered by a standard 9-volt battery 56 for generating a voltage which powers all of the electronic circuitry therewithin. The battery 56 is connected to a power bus (not shown) for interconnecting the various power input terminals of the electronic devices via a normally closed spring loaded switch 57, discussed in greater detail below.

Turning to FIG. 4, the hider unit 3 is shown in greater detail. In particular, an oscillator 59 is connected to a clock divider 61 in a similar manner as discussed above with reference to FIG. 3. The A clock signal output from clock divider 61 is applied to a clock input of a radio transmitter 63 which, as discussed above, continuously transmits a radio frequency signal for reception by the receiver 51 of seeker unit 5 (FIG. 3).

However, in response to depression of clock button 15, which in accordance with FIG. 4 is in the form of ganged switch, transmission of the R signal from transmitter 63 is temporarily inhibited.

More particularly, upon depressing clock button 15, a sub-divided clock signal output from divider 61 is applied to a first input of an OR gate 65. In response, the OR gate 65 generates a corresponding clock signal for application to the clock input CLK of a counter 67. Respective outputs QA, QB and QC of counter 67 are connected to inputs of bar graph controller 17. Thus, counter 67 counts while clock button 15 is depressed resulting in a visual indication of the total amount of time the clock button 15 has been depressed appearing at bar graph controller 17.

Depression of clock button 15 also causes a first input of an exclusive OR gate 69 to be connected to a source of logic high voltage $+V$. A second input of exclusive OR gate 69 is connected via button 15 to the QD output of counter 67. The QD output of counter 67 is at a logic low level until the counter has counted to a value of Hex 1000 (i.e. 16 decimal). While the QD output of counter 67 is at a logic low level, exclusive OR gate 69 generates a logic low level signal in response to successive or continuous depressions of clock button 15. The logic low level signal output from exclusive OR gate 69 is applied to the enable input of transmitter 63, thereby enabling transmission of the RF signal.

However, in response to counting to a value of 1000 (Hex), the QD output of counter 67 goes to a logic high voltage level for application to a second input of OR gate 65 and the second input of exclusive OR gate 69. Thus, in response to further depressions of clock button 15, OR gate 65 generates a continuous logic high level signal for application to the CLK input of counter 67, and the first and second inputs of exclusive OR gate 69 remain at logic high voltage levels such that a logic high level signal is output therefrom. Accordingly, the transmitter 63 is maintained enabled and the bar graph controller 17 indicates a minimum amount of "clock power" remaining for the hider unit 3.

As discussed above with reference to FIG. 1, in the event that the seeker 1D reaches home base unit 2 before a located one of the hiders 1A, 1B ... 1C, the home base unit 2 generates a signal for indicating to the remaining hiders that the located hider has been caught and that they should return to home base unit 2 to recommence the game.

The signal generated by home base unit 2 is preferably in the form of an FM carrier signal having a frequency corresponding to the B clock signal output from clock divider 61. The B clock signal is applied to a CLK input of a further receiver 71. Upon receipt of the further FM signal from home base unit 2 via antenna 73, receiver 71 generates a distinctive melody signal via speaker 25, and furthermore generates a signal present logic high pulse for resetting counter 67 in order to re-commence a new round of the game.

Transmitter 63 generates the R signal via antenna 64.

As discussed above with reference to FIG. 3, the electronic components of the hider units 3 are preferably powered by means of a 9-volt battery 75 via a normally closed spring loaded switch 70.

When not in use, the hider units 3 and the seeker unit 5 are preferably disposed in predetermined slots 80 (FIG. 1) of the home base unit 2. Preferably, at the bottom of the recessed slots 80, an upstanding tab is provided (not shown) for insertion into a corresponding dimensioned slot 82 (FIGS. 2A and 2B) of the respective hider units 3 and seeker unit 5. The push buttons 57 and 77 of the seeker unit 5 and hider units 3 are disposed at the extremity of the slots 82, such that upon inserting the hider or seeker units into the respective slots 80 of home base unit 2, the upstanding tab portion effectively depresses the spring loaded switches 57 and 77 thereby disabling power from the circuitry disposed therewithin. However, upon removing the hider and seeker units from the corresponding slots 80, the spring loaded switches 57 and 77 are urged closed, thereby powering the electronic circuitry.

No ON-OFF switches are provided for the hider and seeker units 3, for the reason that children playing the game may be tempted to simply turn off the hider units 3, thereby inhibiting generation of the R signal, and effectively cheating within the context of the game. It is for this reason that the sophisticated circuit powering system of the present invention is provided, responsive to insertion or removal of the hider and seeker units from the home base unit 2.

Figure 5:
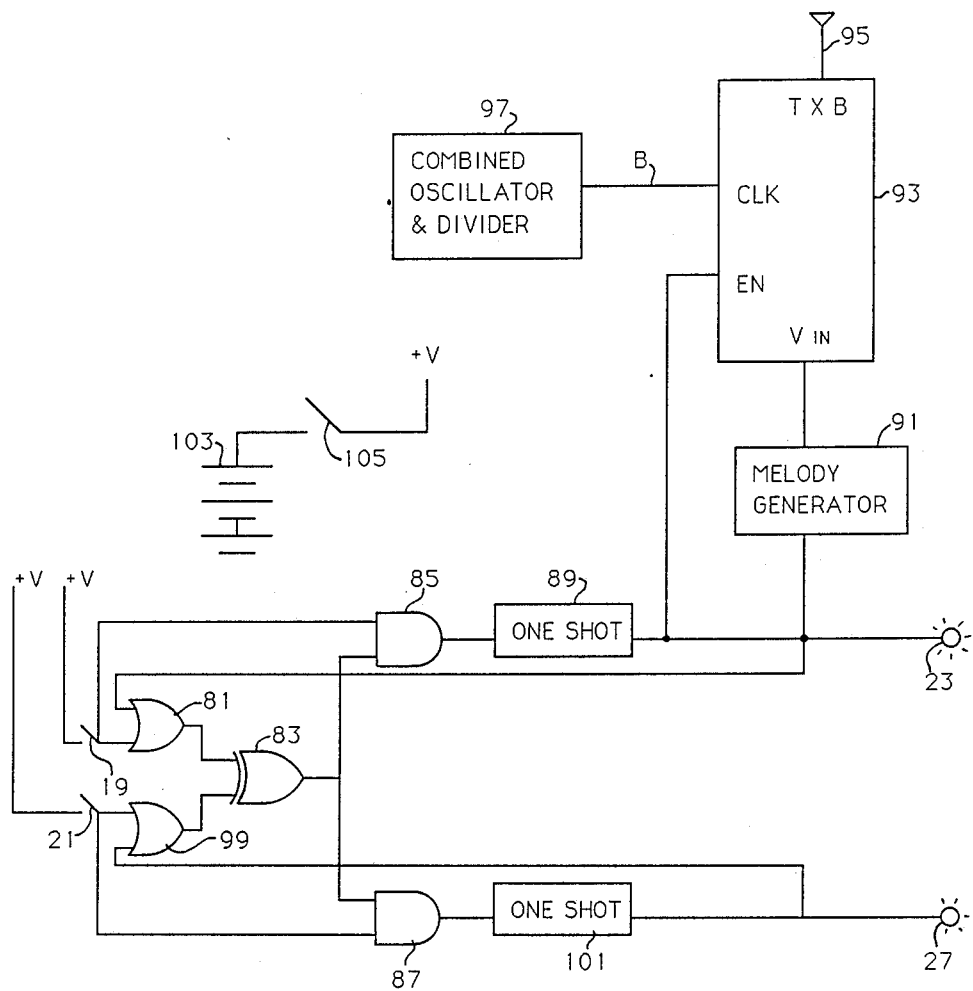
FIG. 5 is a block schematic diagram of a home base unit in accordance with the preferred embodiment.

Turning finally to FIG. 5, the circuitry of the home base unit 2 is shown in greater detail. In operation, upon depression of the seeker foot pad 19, a logic high voltage level is applied to a first input of OR gate 81 which in response applies a logic high level signal to a first input of exclusive OR gate 83. Provided that the foot pad switch 21 is not also closed, exclusive OR gate 83 generates a logic high level signal for application to first inputs of AND gates 85 and 87. Closure of the foot switch 19 also applies a logic high level signal to the second input of AND gate 85, though no similar logic high level signal is applied to the second input of AND gate 87. In response, AND gate 85 generates a logic high signal for application to one-shot circuit 89, which in turn illuminates light 23 and triggers generation of a melody generator 91 and enables transmitter 93. The output of one-shot circuit 89 remains at a logic high level for a predetermined amount of time (e.g. 3 seconds) during which time the distinctive melody is transmitted from FM transmitter 93 via antenna 95 for reception by the various receivers 71 of the hider units 3. Transmitter 93 is driven by a frequency divided B clock signal received from combined oscillator and divider 97.

The output of one-shot circuit 89 is also applied to a second input of OR gate 81 such that the output of OR gate 81 remains at a logic high level for the aforementioned predetermined length of time. Consequently, in the event that the hider subsequently reaches the home base unit 2 within the predetermined length of time, and depresses foot switch 21, the output of OR gate 99 goes to a logic high level such that the output of exclusive OR gate 83 goes to a logic low level. The output of AND gate 87 thus remains at a logic low level.

However, in the event that one of the hiders reaches home base unit 2 prior to the seeker and depresses foot switch 21, the output of OR gate 99 goes to a logic high level resulting in a logic high level signal output from exclusive OR gate 83 applied to the first input of AND gate 87. The two logic high level signals applied to the inputs of AND gate 87 result in generation of a logic high level enabling signal via additional one-shot circuit 101, thereby illuminating light 27. The signal output from one-shot circuit 101 is applied to the second input of OR gate 99, thereby preventing subsequent illumination of light 23 and generation of the distinctive melody signal via transmitter 93 in the event that the seeker 5 depresses foot switch 19 within the predetermined length of time that one-shot circuit 101 is generating a logic high output signal.

The home base unit 2 is preferably also powered by means of a 9-volt transistor battery 103, which can be level shifted and adjusted to suit the various power requirements of the circuit components of the home base unit. The battery power received from battery 103 may be applied to the various circuits by means of a bus (not shown) through an ON/OFF switch 105.

As discussed above, the game is reset by means of depressing the foot switch 19 (provided that this occurs more than 3 seconds after depression of the foot switch 21), resulting in generation of a distinctive melody signal via transmitter 93, and receipt thereof via receivers 71 in the hider units 3 and consequent resetting of counter circuits 67 therewithin.

The various FM receivers and transmitters utilized in the present invention preferably operate in the unlicensed consumer FM band. Such transmitters and receivers are used in well known baby monitoring devices such as those manufactured by Fisher Price Company.

Other modifications and variations of the present invention are possible. For example, as an alternative to utilizing FM transmitters and receivers, AM transceivers or even ultra-sound transceivers may be utilized within the scope of the invention. Also, as an alternative to the various transmitters 3 generating the same carrier frequency signal, it is contemplated that inharmonically related carrier frequency signals may be generated by respective ones of the transmitters in order to avoid phase cancellation and multi-path fading. Furthermore, it is contemplated that the seeker unit 5 may poll individual ones of the hider units 3 at a single frequency by means of generating a 4-bit address or the like. Each hider unit 3 would then in response generate a carrier frequency at the same (or other) frequency in response to being polled. The seeker unit 5 according to this alternative embodiment, would then measure the strength of the polled hider unit 3 and in response generate the appropriate audio and visual signal indicating field strength. It is contemplated that a large capacitor may be connected to the signal strength output of the receiver 51 in the seeker unit 5 in order to cause a smooth transition of detected field strength responsive to various ones of the hiders utilizing their respective clocking functions.

All such embodiments or variations are believed to be within the scope of the present invention as defined by the claims appended hereto.

I claim:

1. Apparatus for playing an enhanced game of hide and seek, comprising:
   (a) a plurality of portable transmitter means adapted for being carried by a corresponding number of individuals in hiding, for generating respective output signals each contributing to an output signal field in the vicinity of said transmitters,
   (b) portable receiver means adapted for being carried by a further individual seeking to locate said individuals in hiding, for measuring field strength of said output signal field and in response generating a further signal representative of relative proximity to respective ones of said transmitter means,
   whereby generation of said further signal assists said further individual in locating said individuals in hiding,
   (c) first circuit means included in each of said transmitter means for selectively disabling generation of said respective output signals, whereby disabling generation of said respective output signals assists said individuals in hiding to avoid being located by said further individual, and
   (d) second circuit means included in each of said transmitter means for measuring duration of said disabling generation of said respective output signals, and in the event said duration exceeds a predetermined length of time then disabling said first circuit means, whereby said individuals in hiding are prevented from permanently disabling generation of said respective output signals.

2. Apparatus as defined in claim 1, further comprising a stationary transmitter means for generating an additional output signal, and means for enabling said additional transmitter means responsive to actuation by a predetermined one of said individuals in hiding.

3. Apparatus as defined in claim 2, wherein each of said portable transmitters further includes an additional receiver means for receiving said additional output signal and in response generating an additional further output signal, whereby generation of said additional further output signal alerts said individuals in hiding that said predetermined one of said individuals has actuated said means for enabling.

4. Apparatus as defined in claim 1, wherein said second circuit means includes means for displaying said predetermined length of time minus said duration.

5. Apparatus as defined in claim 4, wherein said means for displaying includes an LED bar graph display.

6. Apparatus as defined in claim 1, wherein said respective output signals are radio frequency signals.

7. Apparatus as defined in claim 6, wherein said radio frequency signals are consumer band FM radio signals.

8. Apparatus as defined in claim 1, wherein said portable receiver means further comprises means for initially disabling generation of said further signal for a predetermined length of time, whereby said individuals are given an opportunity to hide before said further individual begins seeking to locate said individuals in hiding.

9. Apparatus as defined in claim 1, wherein said further signal is an audible tone having frequency proportional to said field strength.

10. Apparatus as defined in claim 1, wherein said portable receiver means further comprises an FM radio receiver for receiving said respective output signals and in response generating a DC signal proportional to said field strength, and voltage controlled oscillator means for receiving said DC signal and in response generating an audible tone having frequency proportional to said DC signal.

11. Apparatus for playing an enhanced game of hide and seek, comprising:
(a) a plurality of portable hider units for generating respective output signals of predetermined strength;
(b) a single portable seeker unit for receiving said respective output signals and in response detecting said predetermined strength and generating a further signal representative of relative proximity to respective ones of said hider units,
(c) first circuit means included in each of said hider units for selectively disabling generation of said respective output signals, and
(d) second circuit means includes in each of said hider units for measuring duration of said disabling generation of said respective output signals, and in the event said duration exceeds a predetermined length of time when disabling said first circuit means.

12. Apparatus as defined in claim 11, wherein said second circuit means includes means for displaying said predetermined length of time minus said duration.

13. Apparatus as defined in claim 12, wherein said means for displaying includes and LED bar graph display.

14. Apparatus as defined in claim 11, wherein said respective output signals are radio frequency signals.

15. Apparatus as defined in claim 14, wherein said radio frequency signals are consumer band FM radio signals.

16. Apparatus as defined in claim 11, wherein said portable receiver means further comprises means for initially disabling generation of said further signal for a predetermined length of time.

* * * * *